(No Model.)
J. A. BALL.
TRUNK.
No. 281,955. Patented July 24, 1883.
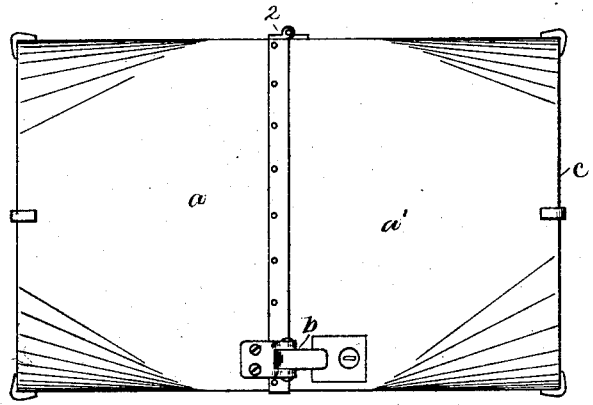
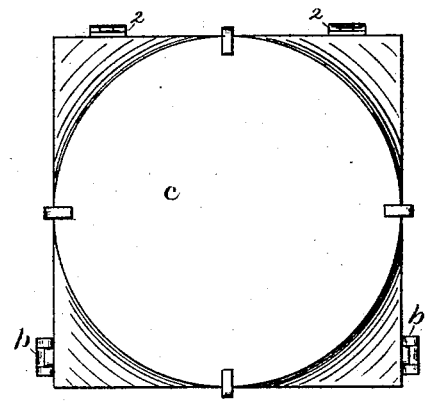
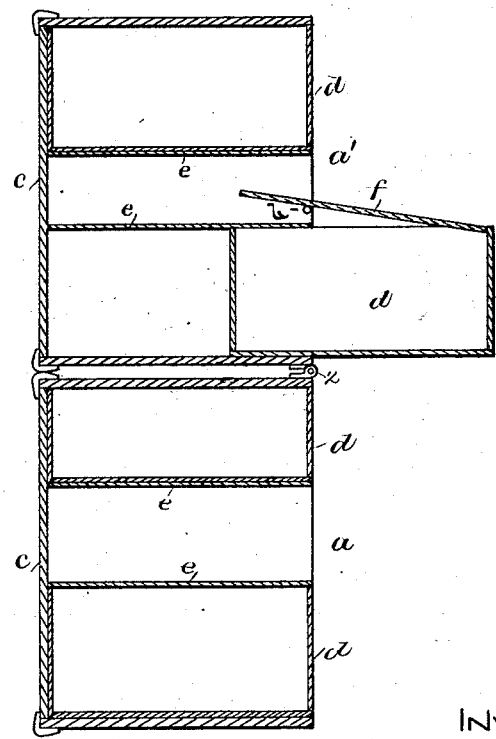
WITNESSES
Fred A. Powell
A. C. Orne
INVENTOR
John A. Ball
by
Crosby & Gregory
Attys.

UNITED STATES PATENT OFFICE.

JOHN A. BALL, OF OAKLAND, CALIFORNIA.

TRUNK.

SPECIFICATION forming part of Letters Patent No. 281,955, dated July 24, 1883.

Application filed May 9, 1883. (No model.)

*To all whom it may concern:*

Be it known that I, JOHN A. BALL, of Oakland, county of Alameda, California, have invented an Improvement in Trunks, of which the following description, in connection with the accompanying drawings, is a specification, like letters on the drawings representing like parts.

My invention, relating to a trunk, has for its object to produce a more convenient trunk than those now in common use, it being so constructed that when the trunk is open all parts of its contents are readily accessible, and it being easily handled when closed for transportation. The trunk-body is made in two parts, preferably of substantially equal size, the said parts being hinged together, so that one part may be turned upon the other part, leaving one side of each part open, with its entire interior accessible. The trunk, made of the desired height, width, and length, is divided in a vertical plane between its ends, and the portions or sections at either side are provided with drawers sliding toward the other portion, and when the trunk is open, with one portion resting upon the other, the drawers in both parts slide forward in the same direction, and the open trunk thus constitutes a bureau or stand provided with drawers, any one of which can be drawn out without disturbing the others. A portion of the space in each section of the trunk will preferably be divided by horizontal partitions to strengthen the trunk and serve as a receptacle for a drawer. The ends of the trunk are preferably made round, so that it may be rolled like a barrel on its chine, thus greatly facilitating handling in transportation and greatly reducing the wear of the trunk itself.

The general nature of my invention being as above stated, it consists in certain improved details of construction, fully hereinafter described.

Figure 1 is a front elevation of a trunk embodying this invention when closed for transportation; Fig. 2, an end elevation thereof, and Fig. 3 a vertical section of the trunk when open.

The trunk-body is divided between its ends into two portions or sections, $a$ $a'$, hinged together at 2, and provided with one or more locks, $b$, by which the two portions are securely fastened together, as shown in Fig. 1, when the trunk is closed for transportation.

The trunk is mainly of the usual rectangular shape; but its ends $c$ are made round, as shown in Fig. 2, so that the said trunk may be more readily rolled when in an inclined position, it then resting upon the edges of the round end, just as a barrel is rolled upon its chine.

When the locks $b$ are unlocked, one of the ends, $a'$, may be turned upon the hinges 2, so as to rest upon the other end, $a$, as shown in Fig. 3, thus leaving the whole interior of each portion or section accessible, as shown in Fig. 3. Each of the portions $a$ $a'$ preferably contains one or more drawers, $d$, adapted to slide outward from the end $c$ of the trunk, so that when the trunk is opened, as shown in Fig. 3, the drawers may all slide in one direction, and the trunk becomes substantially equivalent to a bureau or similar piece of furniture provided with drawers. Each portion of the trunk is also provided with partitions $e$ between the drawers, which, when the trunk is opened, constitute shelves, and also serve as braces to strengthen the trunk.

If desired, one or both of the spaces between the partitions $e$, that are not occupied by drawers, may have a removable box provided with a mirror, and toilet articles adapted to be placed upon the top of the trunk when opened, and one of the drawers, at a convenient height, may have a top, $f$, arranged for writing, it resting upon a projection, $h$, in an inclined position, as shown, and when thus equipped the trunk is very convenient for camping out or similar uses, it serving the purpose of several articles of furniture when opened.

When the trunk is closed, each portion serves as a lid or cover for the other portion, holding the drawers and contents of the recesses between the shelves securely in place.

It is obvious that the hinges 2, instead of being at the top of the trunk, as viewed in Figs. 1 and 2, might be placed at one side—as, for instance, at the rear side in Fig. 1—and the lock or locks $b$ at the other side, so that the two portions of the trunk would swing in a horizontal plane and stand at the same level when the trunk is opened, instead of one above the other, as before described.

Instead of using the drawers, doors or covers may be employed for the open ends of the two portions of the trunk, and the said covers, as well as the partition or drawers, may, if desired, be of paper-board of requisite stiffness to make the trunk lighter.

The trunk may be provided with the usual casters.

I am aware that trunks have been hitherto known divided horizontally from end to end and hinged together, so that they may be set up to form a bureau with drawers. I make no claim to devices of this character. My trunk is divided across its length, so that when set up it occupies much less space, and the drawers, being nearly square, are of more convenient shape. Another advantage of my construction is, that it has solid ends, and is consequently much stronger than a trunk parted from end to end.

I claim—

A trunk having solid ends and divided across its length into two equal parts, hinged together at the top and having a flange overlapping the joint, in combination with fastening devices and drawers, all substantially as set forth.

In testimony whereof I have signed my name to this specification in the presence of two subscribing witnesses.

JOHN A. BALL.

Witnesses:
G. W. GREGORY,
W. H. SIGSTON.